Sept. 1, 1931.   H. A. GENEST   1,821,432
APPARATUS FOR AND METHOD OF SHRINKING, ETC., FELT ARTICLES
Filed Sept. 29, 1928   2 Sheets-Sheet 1

Inventor
Homer A. Genest

By H. Clay Linday
Attorney

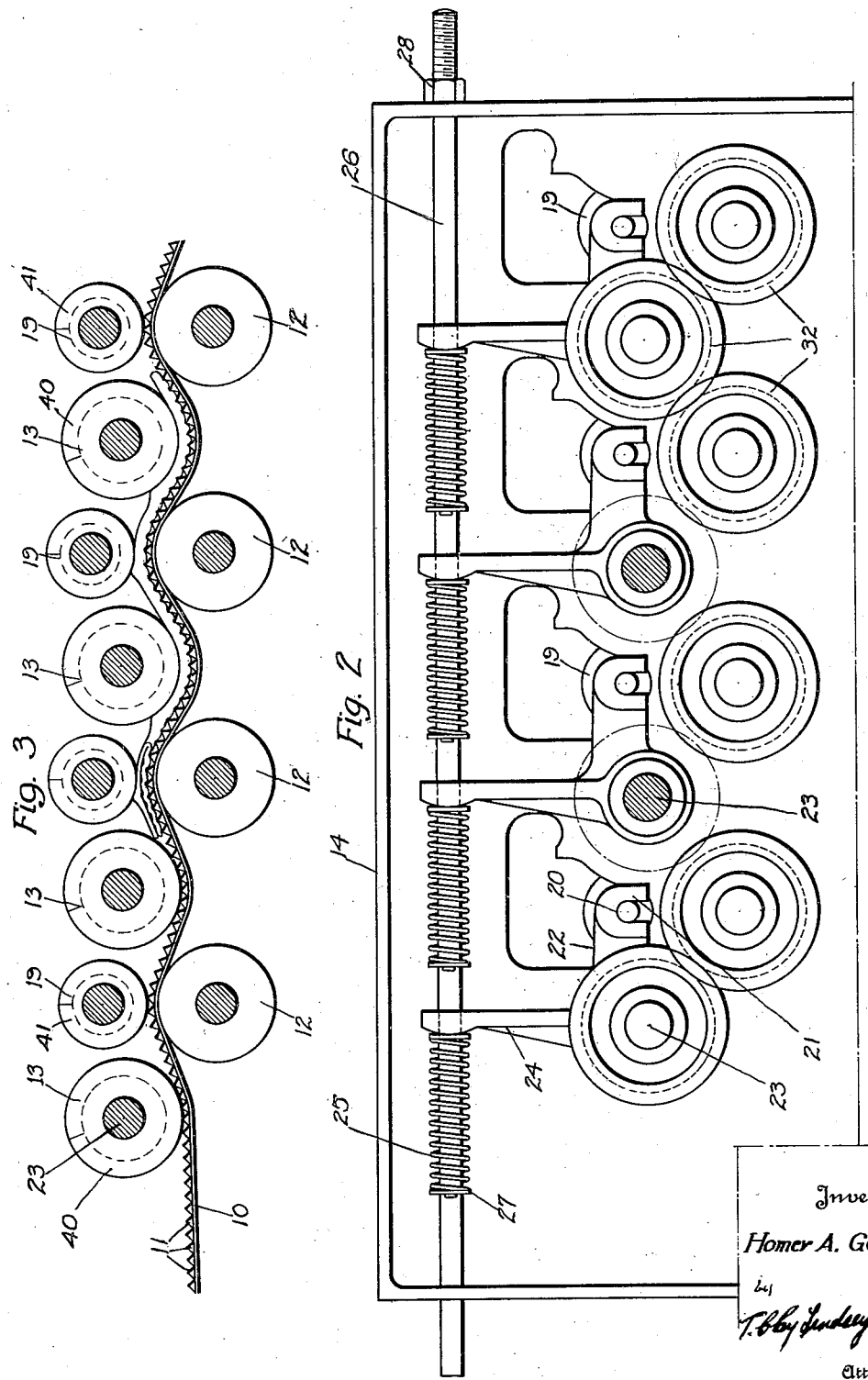

Patented Sept. 1, 1931

1,821,432

UNITED STATES PATENT OFFICE

HOMER A. GENEST, OF DANBURY, CONNECTICUT, ASSIGNOR TO UNITED STATES HAT MACHINERY CORPORATION, OF NEW YORK, N. Y., A CORPORATION OF VIRGINIA

APPARATUS FOR AND METHOD OF SHRINKING., ETC., FELT ARTICLES

Application filed September 29, 1928. Serial No. 309,190.

This invention relates to the shrinking of felt articles, for example bats from which fur or felt hats are made.

The aim of the invention is to provide an improved machine for and method of shrinking hat bats and the like having various features of novelty and advantage.

More particularly, an aim of the invention is to provide an improved machine which is very efficient in that the shrinking and felting actions are accelerated, resulting in increased production; which will produce better and superior bats from which better shaped hats having a softer or mellower feel may be made; and which may be employed to carry out the shrinking and felting operations to a greater extent without resorting to manual working.

A further aim of the invention is to provide certain improvements in the machine disclosed in my Patent No. 1,533,350, granted April 14, 1925, for machine for shrinking felt articles, and to provide improvements in the process disclosed in my Patent No. 1,533,351, granted April 14, 1925, for process of shrinking, etc., felt articles.

Other objects will be in part obvious and in part pointed out more in detail hereinafter.

In the accompanying drawings, I have shown one of the various embodiments which the present invention may take, but it is to be understood that this showing is by way of exemplification only and is not to be taken as restrictive of my conception, the invention being susceptible of various modifications and changes which would be within the spirit of the invention without departing from the scope of the appended claims.

In these drawings:

Fig. 2 is a side view of what is shown in Fig. 1; and

Fig. 3 is a diagrammatic view shownning the belt which supports the bats in edge elevation and the rolls cooperating with the belt in end elevation.

Figure 1:
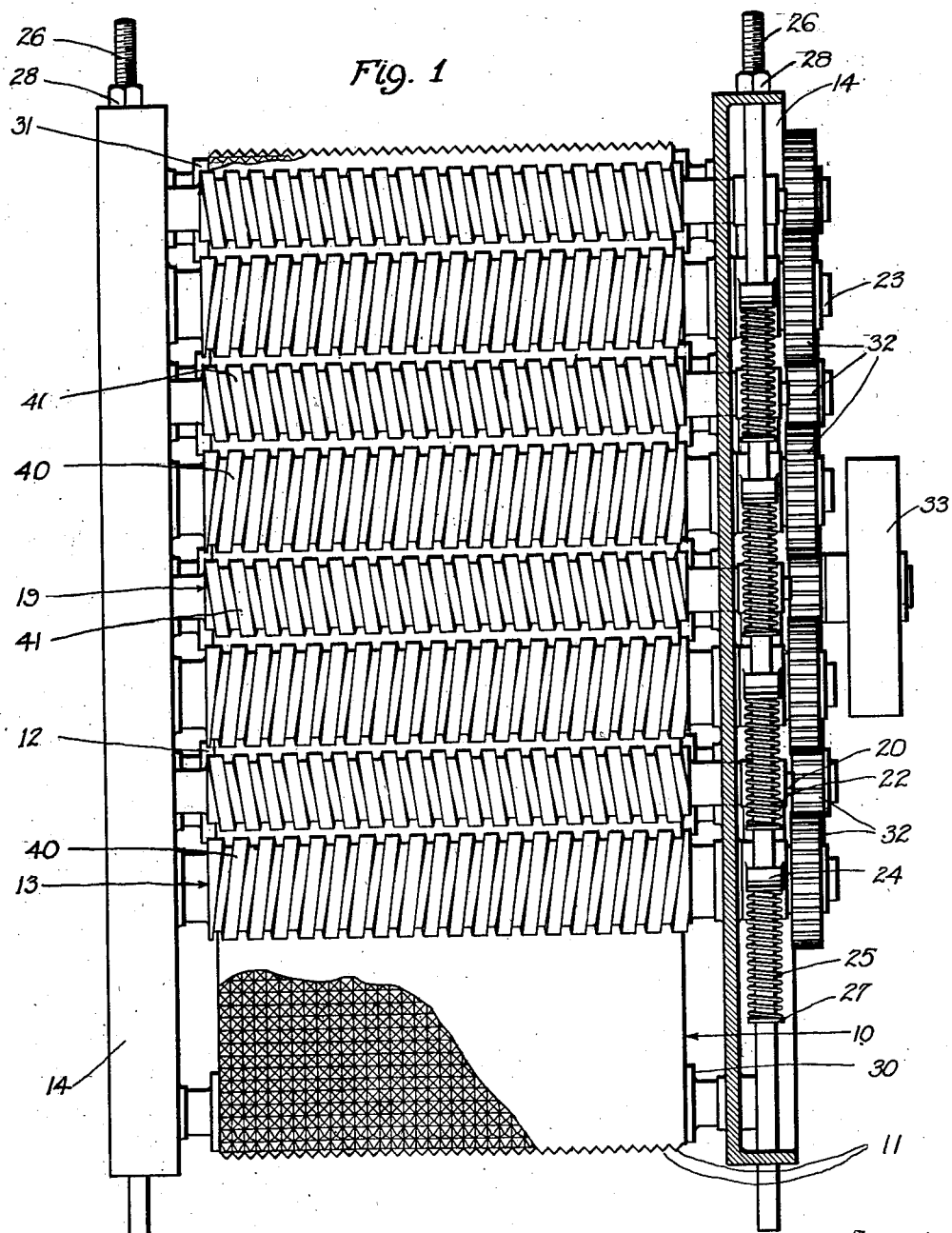
Figure 1 is a top plan view of so much of a machine as is necessary to illustrate the features of the present invention.

In the accompanying drawings, the machine is shown only in part and somewhat diagrammatically, as the general construction and arrangement thereof may be similar to that disclosed in my said Patents Nos. 1,533,- 350–1. The machine has a belt 10 like, and supported in substantially the same manner as, the bat carrying belts or aprons shown in my said patents. The working face of the belt is provided with a multiplicity of projections or kneading knuckles 11 which are preferably elastic and of pyramidal form. The belt passes between a plurality of guide rolls which are arranged to cause the belt to move in a wavy path or course; that is to say, the guide rolls are arranged to result in a bending or flexure of the belt alternately in opposite directions. Of these guide rolls, those designated by the numeral 12 may be termed, for convenience, belt supporting rolls. The intervening rolls, which bear upon the upper or working face of the belt, and which are designated by the numeral 13, may be referred to as belt deflecting rolls. The rolls 12 and 13 are journalled in suitable side frames 14.

In addition to the guide rolls, there are provided a plurality of pressure rolls 19 which are adapted to engage the working face of the belt and the bats carried thereby. In the present instance, one such roll 19 is associated with each of the supporting rolls, but the number thereof may be varied as desired. The pressure rolls may be urged against the travelling belt and the bats carried thereby in any suitable manner. In the present illustrative disclosure, each pressure roll has, at its opposite ends, gudgeons 20 which engage in notches 21 provided in arms 22 of right angled levers which are journalled at their intermediate portions on the gudgeons 23 of the deflecting rolls.

Bearing against the vertical arms 24 of these levers are springs 25. These springs are carried by a rod 26 provided with collars 27 against which the ends of the springs are adapted to engage. The rod passes through the upper ends of the arms 24. The tension of the springs, and therefore the pressure with which the rolls 19 bear against the belt, may be varied by turning the nut 28 provided on the end of the rod 26 and engaging against the frame 14. The belt 10 may be endless and pass about drums 30 and 31. The various drums and guide rolls may be driven in any suitable manner, the gears 32 being shown by way of illustration. 33 designates a drive pulley. The arrangement so far described is generally similar in construction and operation to that shown in my said patents.

In accordance with the present invention, the rolls which engage the working face of the belt are provided with means for working the bat or, at least, the top lever or ply thereof, crosswise; that is, for shifting and manipulating successive portions of the bat with which they come into engagement back and forth in a direction substantially at right angles to that in which the bats are advanced as they are carried beneath these rolls by the belt. More particularly, some of the rolls, and preferably all of the rolls which engage the working face of the belt, are provided with spiral ribs or threads of relatively cross pitch, and these ribs or threads are so arranged that each portion of the ply of the bat which they engage is manipulated crosswise first in one direction and then crosswise in the other direction, and so on. To this end, the threads on adjacent rolls run in opposite directions. For instance, the deflecting rolls 13 may be provided with right hand threads or ribs, and the intervening pressure rolls 19 may have left hand threads or ribs.

The threads or ribs on the deflecting rolls are designated by the numeral 40 and those on the pressure rolls by the numeral 41. The number of threads on each roll, and the pitch of the threads may, of course, be varied to suit conditions.

In operation, as the belt passes between the supporting rolls and the associated deflecting rolls, it is given a wavy course so that the knuckles, as they pass over the supporting rolls, move slightly apart and, as they pass beneath the deflecting rolls, they move slightly towards each other, as described in my said patents. This motion of the pyramids or knuckles effects or assists in the felting action and produces, in a large measure, the shrinking operation in the bat. The rapid opening or moving apart and closing or moving together of the pyramid knuckles, buried as they are in the body of the soft bat, produce a rapid movement of the fur fibres in the direction in which the bat advances in the machine; that is to say, a stretching and compressing action, generally in the direction in which the belt moves, is effected which results in the desired shrinking and felting. It is probable that the pressure rolls, aided and assisted by the deflecting rolls, produce, to a large extent, the felting action, that is, the tightening of the bat. As the bats pass through the machine, the pressure rolls effect a crozing action of the bats in a succession of slight shifting movements, as described in my said patents. The spiral rolls which engage the working face of the belt and the bats carried thereby work or manipulate the top layers of the bats crosswise in a manner somewhat similar to that disclosed in my Patent No. 1,586,551, issued June 1, 1926, for method of and apparatus for treating felt articles.

It is to be observed that the line of action of the knuckles and the line of action of the spiral rolls are generally at right angles to each other so that the two layers or plies of the bats are worked or manipulated in directions at right angles to each other instead of parallel to each other as is the case in the patents herein referred to. The pyramid knuckles, as the belt passes about the guide rolls, open and close in the direction in which the belt moves so that the lower layer or ply of the bat is worked in that direction. The spiral rolls work or move the successive portions of the top layer of the bat crosswise first in one direction, as it passes under a deflecting roll, then in the other direction, as it passes under a pressure roll, and so on. The upper ply is zig-zagged back and forth or snaked, so to speak. While the guide rolls 13 are simultaneously shifting spaced portions of the upper ply in one direction, the pressure rolls are shifting the intervening portions crosswise in the opposite direction. It is, of course, understood that, during the felting and shrinking operations, a constant flow of hot water is discharged from above onto the rolls engaging the belt and the bats so as to maintain the bats moist and hot. The spiral threads on the rolls will more readily hold the water, which means that the bats are maintained in a better heated condition and better felting and shrinking actions are obtained.

It has been found that, by the use of a machine constructed in accordance with the present invention, the felting and shrinking actions are accelerated, a more rapid production is obtained, the hats made from the bats are wider and better shaped and are of softer or mellower feel, and the hats are otherwise improved. The shrinking and felting actions may be carried further and, in case of light weight bats, the shrinking operation may be carried to final shape without further manual working other than stretching.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine for shrinking hat bats and the like, a bat carrying belt provided on its working face with a multiplicity of kneading knuckles and arranged to move in a wavy course and without transverse movement, and rolls extending transversely of and adapted to engage the working face of said belt and the bats carried thereby, alternate rolls being provided with means for shifting portions of the ply of the bat in engagement therewith transversely in one direction and intervening rolls being provided with means for shifting portions of the ply of the bat in engagement therewith in the opposite direction.

2. In a machine for shrinking hat bats and the like, a bat carrying belt provided on its working face with a multiplicity of kneading knuckles and arranged to move in a wavy course and supported against transverse movement, and rolls extending transversely of and adapted to engage the working face of said belt and the bats carried thereby, some of said rolls being provided with spiral ribs running in one direction and other of said rolls being provided with spiral ribs running in the other direction.

3. In a machine for shrinking hat bats and the like, a bat carrying belt provided on its working face with a multiplicity of kneading knuckles and arranged to move in a wavy path, elements supporting said belt and devoid of means for moving the same transversely and rolls extending transversely of and adapted to engage the working face of said belt and the bats carried thereby, alternate rolls being provided with right hand threads and intervening rolls with left hand threads.

4. In a machine for shrinking hat bats and the like, a belt adapted to support a bat in unrolled and substantially flatwise condition and having on its bat engaging surface a multiplicity of individual elastic kneading knuckles, means for bending under pressure said belt and the bat thereon progressively and repeatedly to and fro thereby causing the knuckles to alternately move towards and away from each other, means engaging the bat carrying surface of said belt and the bat carried thereby and arranged to simultaneously move spaced portions and alternately move the same portions of the ply of the bat in engagement therewith transversely in opposite directions and means for supporting said belt substantially against transverse shifting movements.

5. In a machine for shrinking hat bats and the like, a travelling belt having a surface adapted to support a bat in unrolled and substantially flatwise condition, supporting rolls and deflecting rolls arranged to bend said belt alternately in opposite directions, said deflecting rolls being in engagement with the bat carrying surface of said belt, and pressure rolls bearing against the bat carrying surface of said belt and interposed between said deflecting rolls, said deflecting rolls and said pressure rolls being provided with spiral threads running in opposite directions and arranged to work the ply of the bat in engagement therewith transversely and alternately in opposite directions said supporting rolls being devoid of threads.

6. In a machine for shrinking hat bats and the like, a belt provided with a working face having a multiplicity of kneading knuckles, supporting rolls and deflecting rolls staggeredly arranged to guide said belt in a wavy course, said deflecting rolls being provided with threads running in one direction, and pressure rolls between said deflecting rolls and having threads running in the opposite direction said supporting rolls being devoid of means for shifting the belt transversely.

7. The herein described method of shrinking hat bats and the like, which consists in manipulating one ply of the bat in unrolled condition back and forth in one direction while manipulating the other ply back and forth in a direction transverse to said first direction.

8. The herein described method of shrinking hat bats and the like, which consists in kneading one ply of the bat by alternately moving in engagement therewith and in one direction a plurality of kneading knuckles towards and away from each other, and simultaneously and progressively moving spaced portions of the other ply of the bat in opposite directions.

9. The herein described method of shrinking hat bats and the like, which consists in placing the bat upon a member having a knuckled surface, passing said member and the bat thereon in a wavy course, and simultaneously moving spaced portions and alternately moving the same portions of that ply of the bat not in engagement with said member back and forth in opposite directions.

HOMER A. GENEST.